106. COMPOSITIONS, COATING OR PLASTIC

Patented July 31, 1934

1,968,489

UNITED STATES PATENT OFFICE 1,968,489

ACOUSTICAL PLASTER

Seymour M. Jenkins, Lakewood, Ohio

No Drawing. Application January 3, 1931, Serial No. 506,497. Renewed September 24, 1932

17 Claims. (Cl. 106—24)

This invention relates to a composition of matter, for example, plasters and the like, and is more particularly concerned with such materials which possess the properties of heat insulation, sound insulation or absorption, light weight, easy workability, uniform texture, and controllable rates of drying. It also relates to such materials which can be rendered highly resistant to heat, can be controlled as to hardness within certain ranges and can be colored. This application is a continuation in part of my co-pending application Serial No. 289,634, filed June 30, 1928.

Material embodying the present invention may be variously used. For example, it may be employed as a wall covering and applied directly to a metal surface such as structural steel members, or to lath or wood or metal. When so employed it is heat insulating or fireproof, highly sound insulating or absorbing, and being of a spongy or resilient nature, it is capable of expanding and contracting considerably for which reason the tendency to develop wall cracks is greatly lessened. When employed as the initial wall covering it furnishes a good base to which a finish plaster coat may be applied with good adherence by reason of the fairly soft open texture of the material.

A typical composition of material embodying the present invention for the just described purposes is as follows:

| | Per cent |
|---|---|
| Rock wool | from about 44% to about 53 |
| Diatomaceous earth | from about 37% to about 50 |
| Lime (hydrated or air slacked) | from about 6% to about 8 |
| Flour | from about 1% to about 5 |

By term "Rock wool" which appears above, I mean any mineral wool having a critical point about 1500° F., at which it breaks down. Materials such as asbestos have a critical point of about 1400° F., that is, at this temperature they break down and become of practically no use as a fireproofing material. Since other materials, which are unable to stand temperatures in excess of about 1500° F., without breaking down, are becoming of little value as fireproofing, they are for the purpose of this invention, with asbestos, excluded from the scope hereof. Accordingly the term "Rock wool" as used in this application is intended to include any and all wools of a mineral nature providing a critical point above about 1500° F. Preferably the materials comprehended by the term "Rock wool", as used here in, are of a fibrous form with the fibers preferably not exceeding ½" length and containing not more than 12% of shot-like particles. Although materials of various chemical composition may be used as "Rock wool" such materials are usually some form of silicates where the silicate forms a material part of the composition. One typical "Rock wool" composition satisfactory for practicing the present invention is the present day commercial product known in the trade as "Gimco Rock wool" and having a chemical analysis approximately as follows:

| | Per cent of weight |
|---|---|
| Silicon oxide ($SiO_2$) | 40 to 57 |
| Aluminum oxide ($Al_2O_3$) | 17 to 12 |
| Iron oxide (FeO) or ($Fe_2O_3$) | 6 to 5 |
| Calcium oxide (CaO) | 21 to 15 |
| Magnesium oxide (MagO) | 13 to 9 |
| Miscellaneous | 3 to 2 |

It is preferred that sulphur should not be present but if present in very small amounts under 1%.

This material may be prepared for use with this invention by various processes. One example of such a process is by steps including: melting the rock; drawing the melted rock in fibres; and annealing the fibres in oil.

Diatomaceous earth is well known commercially as such, and for purposes of this invention may be considered to include Kieselguhr, fossil flour, infusorial earth or fossil meal, which have a large number of very small non-communicating air voids and which for this reason are well adapted for sound absorbing, fireproofing uses. The flour specified may be flour mill sweepings or low grade flour, gluten or any suitable paste or adhesive.

The lime may vary on either side of the range named but the weight of the composition will vary correspondingly.

The rock wool, earth, flour and lime may be mixed dry and then mixed with sufficient water just prior to spreading on the supporting means to form a wall or wall covering. The mix dries out leaving a resilient, soft, coherent, adherent, expansible and contractible mass having a rough surface to which a surface coat of plaster or the like or paint adheres closely. The material is fireproof, and has a weight of about 30 pounds per cubic foot which makes it desirable for ceilings, walls and floors, and also for the sub-wall for finish plaster coats in large buildings where fireproof properties and decreased weight are desirable. The material is capable of absorbing sound to a marked degree and where the higher degree of sound deadening is desired the material should be exposed, that is, not covered with a surface coat such as plaster. For certain purposes the material may be prepared in the form of blocks and laid in the usual manner of laying block materials.

This material increases in strength from about 20% to about 26% when wet after setting. It is thus well adapted for fireproofing because it not only does not burn but exhibits greater adherent strength when wet as is certain to occur in case of a fire, and has less tendency to flake off, crack or otherwise expose the structure which it covers in case of a fire.

When the rate of drying or set is to be prolonged a retarder may be added to the foregoing typical composition. About 1 pound of caustic soda or 5 pounds of laundry starch, or both, may be added to each 100 pounds of the foregoing composition for this purpose. The retarder is preferably first dissolved in hot water and added as a solution.

When the drying or set is to be hastened an accelerator may be used. About 1 pound of ammonium sulphate, common salt or other substances having retarding properties corresponding to the sulphate may be utilized for this purpose and added to each 100 pounds of the typical composition.

When the foregoing typical composition is used without a covering or finish plaster or the like it may be variously colored. For such work a glue like property is preferably imparted to the composition. One satisfactory method of accomplishing this is to add about 5 pounds of laundry starch and about 1 pound of caustic soda both dissolved in hot water to each 100 pounds of the typical composition. After the material has been spread for a day or two a pigment may be applied to the surface of the material. By varying the force with which the pigment is blown against the material, different degrees of unevenness in the surface of the material may be obtained. The pigment is retained by the material into which it may even penetrate a small distance and after the material dries the pigment can be removed only with difficulty and hence is substantially permanent.

Where fire resisting properties are mainly desired the foregoing typical composition may have added to each 100 pounds of it, about 1 pound of hydrated or air slacked lime, about 3 pounds of flour or similar sticking material, about 5 pounds of Portland cement, and from about 2 pounds to about 10 pounds of porous material such as blast furnace slag screenings. This composition may be applied to the structure to be fireproofed and after drying may receive a surface coat of the typical composition or of plaster or both, if desired. It is only necessary to scratch the hard glossy surface of the fireproofing material to provide the necessary anchorage for the surface coat. This fireproof material weighs from about 30 to about 35 pounds per cubic foot, has somewhat less ability to absorb sound than the typical composition, and shows an increase of about 20% in strength when wet after setting. Little or no heat is necessary for drying and setting any of the foregoing materials beyond the heat ordinarily required for ordinary plaster.

The fireproofing material last mentioned is suitable for use in floor and roof construction where it may be applied to expanded lath or the like and covered, in the case of a floor with a cork or suitable covering, and in the case of a roof with a waterproof substance such as tar, pitch and the like. Such use of this material obviates the use of concrete wholly or in part depending on the strength required.

The first mentioned or typical composition also may be used as sound deadening, vermin, moisture, and fireproof material for use in building walls or attics where it may be applied dry and then sprinkled with water to form a non-dusting surface.

I have thus described my invention so that others may be enabled to practice the same and not for the purpose of limiting it to the details set forth. The scope of my invention is defined in what is claimed.

I claim:

1. A cellular wall covering containing "Rock wool," diatomaceous earth, lime and cereal flour and characterized by being spongy, expansible and contractible and weighing approximately 30 pounds per cubic foot.

2. A cellular sound absorbing wall forming material containing between 44% and about 53% of "Rock wool", between about 37% and about 50% of diatomaceous earth, between about 5% and about 8% of lime and between about 1% and about 5% adhesive.

3. A cellular sound absorbing wall forming material containing between about 44% and about 53% of "Rock wool", between about 37% and about 50% of diatomaceous earth, between about 6% and about 8% of lime and between about 1% and about 5% of cereal flour.

4. A cellular material containing principally "Rock wool" and diatomaceous earth, small amounts of lime and flour and a hardening retarder.

5. A cellular material containing principally "Rock wool" and diatomaceous earth, small amounts of lime and flour and a hardening retarder in the form of caustic soda.

6. A cellular material containing principally "Rock wool" and diatomaceous earth, small amounts of lime and flour and a hardening accelerator.

7. A cellular material containing principally "Rock wool" and diatomaceous earth, small amounts of lime and flour and a hardening accelerator in the form of ammonium sulfate.

8. A cellular material containing principally "Rock wool" and diatomaceous earth, small amounts of lime and flour, a hardening retarder, and a pigment on the surface thereof.

9. A cellular material containing principally "Rock wool" and diatomaceous earth, small amounts of lime and flour, a hardening retarder in the form of caustic soda and a pigment on the surface thereof.

10. A cellular material containing principally "Rock wool" and diatomaceous earth, small amounts of lime and flour and a pigment on the surface thereof.

11. A cellular material containing principally "Rock wool" and diatomaceous earth, small amounts of lime and flour, an adhesive and a pigment on the surface thereof.

12. A cellular sound absorbing wall forming material containing between about 44% and about 53% of "Rock wool", a slightly less percentage of diatomaceous earth, sufficient lime to provide a bond and adhesive to the extent of about 5%.

13. A cellular sound absorbing wall forming material containing between about 44% and about 53% of "Rock wool" a slightly less percentage of diatomaceous earth, sufficient lime to provide a bond and adhesive sufficient to render the material adherent and easily workable.

14. A cellular wall material containing principally "Rock wool" and diatomaceous earth, small amounts of lime and flour, and small amounts of Portland cement and blast furnace slag screenings.

15. A cellular material containing principally "Rock wool" and diatomaceous earth, small amounts of a suitable binder and a hardening retarder.

16. A cellular sound absorbing wall forming material containing between 44% and about 53% "Rock wool", a slightly less percentage of diatomaceous earth, suitable binding and adhesive material to the extent of about 5%.

17. A cellular wall material containing principally "Rock wool" and diatomaceous earth, small amounts of a suitable binder and small amounts of Portland cement and blast furnace slag screenings

SEYMOUR M. JENKINS.